United States Patent

Rose

[11] Patent Number: 6,016,624
[45] Date of Patent: Jan. 25, 2000

[54] TRIGGER MECHANISM

[76] Inventor: Hugh Quentin Rose, Hammerton Court, High Street, Tewkesbury, Gloucestershire, GL20 5BN, United Kingdom

[21] Appl. No.: 09/165,821

[22] Filed: Oct. 2, 1998

[51] Int. Cl.[7] .................... A01M 23/24; A01M 23/34
[52] U.S. Cl. ........................................ 43/92; 43/87
[58] Field of Search ...................... 43/85–88, 92

[56] References Cited

U.S. PATENT DOCUMENTS

| | | | |
|---|---|---|---|
| 173,798 | 2/1876 | Larson | 43/87 |
| 549,977 | 11/1895 | Seitz | 43/86 |
| 1,160,872 | 11/1915 | Fox | 43/86 |
| 1,342,425 | 6/1920 | Crago | 43/87 |
| 1,539,103 | 5/1925 | Alston | 43/92 |
| 1,553,536 | 9/1925 | Irvine | 43/88 |
| 1,596,005 | 8/1926 | Diegel | 43/85 |
| 1,865,920 | 7/1932 | Knippelmeir | 43/87 |
| 1,907,360 | 5/1933 | Morrill | 43/87 |
| 1,913,893 | 6/1933 | Morrill | 43/87 |
| 2,168,132 | 8/1939 | Marshall | 43/87 |
| 2,257,299 | 9/1941 | Herstedt | 43/85 |
| 2,333,828 | 11/1943 | Taylor | 43/92 |
| 2,479,196 | 8/1949 | Anderson | 43/87 |
| 2,801,493 | 8/1957 | Warfield | 43/88 |
| 3,060,623 | 10/1962 | Aldrich | 43/87 |
| 3,417,504 | 12/1968 | Anderson | 43/85 |
| 3,967,408 | 7/1976 | Aberg | 43/87 |
| 4,208,827 | 6/1980 | Starkey | 43/87 |
| 4,250,653 | 2/1981 | Davies | 43/87 |
| 4,286,404 | 9/1981 | Novak et al. | 43/87 |
| 4,561,207 | 12/1985 | Novak | 43/87 |
| 4,581,843 | 4/1986 | Fremont et al. | 43/87 |
| 4,751,790 | 6/1988 | Thomas | 43/87 |
| 4,757,639 | 7/1988 | Bertram | 43/87 |
| 5,157,863 | 10/1992 | Godwin | 43/87 |

FOREIGN PATENT DOCUMENTS

| | | |
|---|---|---|
| 1 145 935 | 5/1983 | Canada . |
| 397268 | 6/1932 | United Kingdom . |
| 2 092 422 | 8/1982 | United Kingdom . |
| WO 97/11599 | 4/1997 | WIPO . |

*Primary Examiner*—Michael J. Carone
*Assistant Examiner*—Darren W Ark
*Attorney, Agent, or Firm*—Lahive & Cockfield, LLP

[57] ABSTRACT

A trigger mechanism for an animal trap is disclosed, comprising a trigger plate moveable in a vertical direction and provided with at least one cam surface on its lower face, a retaining pin for preventing release of the trap until triggered, slidable longitudinally thereby to allow release of the trap, the retaining pin being linked to at least one cam follower, such that downward movement of the trigger plate causes the retaining pin to slide thereby causing release of the trap. The trigger plate and the retaining pin are preferably biassed in an adjustable manner so as to allow a degree of selectivity in the animals which are caught.

16 Claims, 3 Drawing Sheets

TRIGGER MECHANISM

TECHNICAL FIELD OF THE INVENTION

The present invention relates to a trigger mechanism, in particular to one which is suitable for use in animal traps.

BACKGROUND ART

Animal traps commonly operate via spring activated foot snares, and are well known devices that require a trigger mechanism to hold and then release a tension, trap-activating spring. The main prior art traps include U.S. Pat. No. 3,060,623 (Aldrich), U.S. Pat. No. 4,581,843 (Freemont), U.S. Pat. No. 5,157,863 (Godwin), CA 1,145,935 (Novak), GB 397,268 (Phelps) and my earlier international application W097/11599. Other traps capture animals by means of closing cage doors, releasing nets, physically striking the animal, etc. etc.

The trigger mechanisms for these traps invariably comprise a bar or plate that pivots around a fulcrum so as to release a tensioned activating spring, cage door, etc., when the bar or plate is depressed. However, it is necessary to construct the bar or plate as a lever in order to provide an adequate force to overcome friction generated by the compressed spring, and this requires the bar or plate to be depressed a considerable distance before the trap is triggered. This allows some animals to withdraw from the trap before or during its activation, after feeling the trigger plate give way beneath them. The animals therefore avoid capture. In addition, the pressure required to trigger these traps will vary purely on the distance between the fulcrum and the point of depression of the trigger bar or plate. This makes the trigger mechanisms inherently non-selective regarding the size and therefore species of the animal setting them off. Inevitably, this lever action also limits the length or diameter of the trigger bar or plate in that the longer the lever, the greater the depression required to trigger the trap. All of these factors limit both the efficiency and effectiveness of such traps.

SUMMARY OF INVENTION

The invention seeks to provide a trigger mechanism that requires minimal depression by a target animal to activate a trap. It also seeks to provide a trap that is adjustable to the size of the animal setting it off. An additional intention is to provide a larger trigger-plate to be used, activating the trap when depressed by a significant extent substantially anywhere on its surface.

The present invention therefore provides a trigger mechanism for an animal trap, comprising a trigger plate movable in a vertical direction and provided with at least one cam surface on its lower face, a retaining pin for preventing release of the trap until triggered, slideable longitudinally thereby to allow release of the trap, the retaining pin being linked to at least one cam follower such that downward movement of the trigger plate causes the retaining pin to slide, thereby causing release of the trap.

BRIEF DESCRIPTION OF DRAWINGS

Embodiments of the present invention will now be described by way of example, with reference to the accompanying drawings in which.

DETAILED DESCRIPTION OF EMBODIMENT

Figure 2:
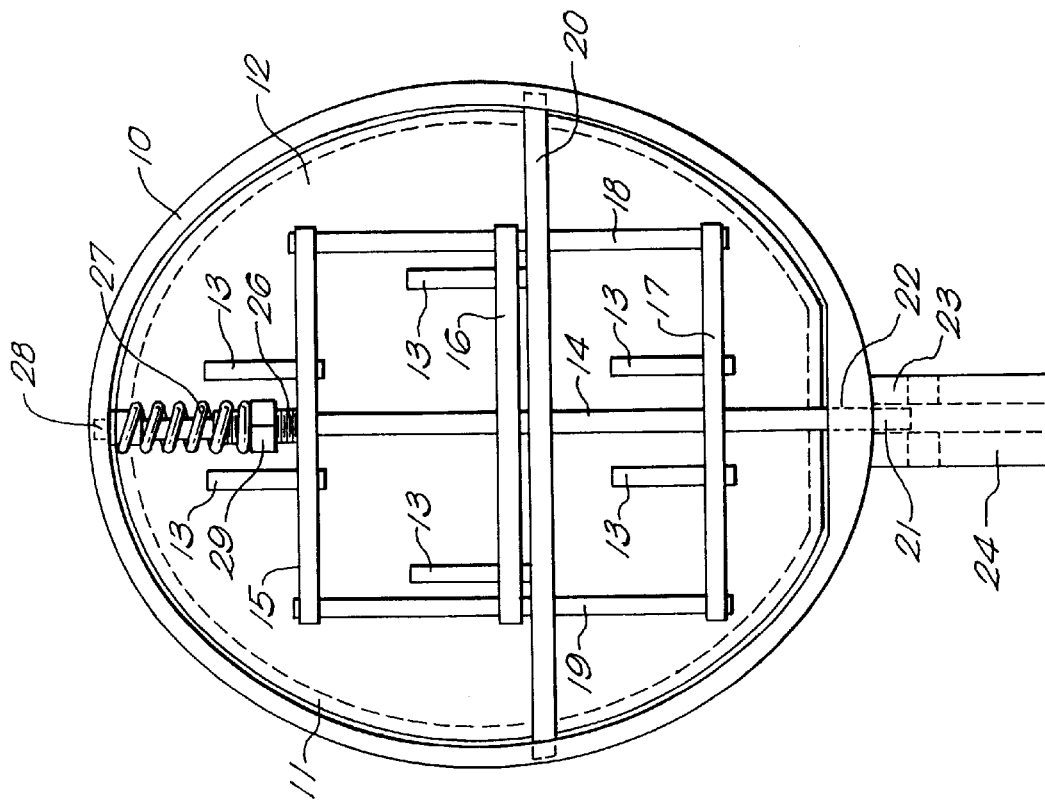
FIG. 2 shows the trigger mechanism of FIG. 1 viewed from below.
Figure 1:
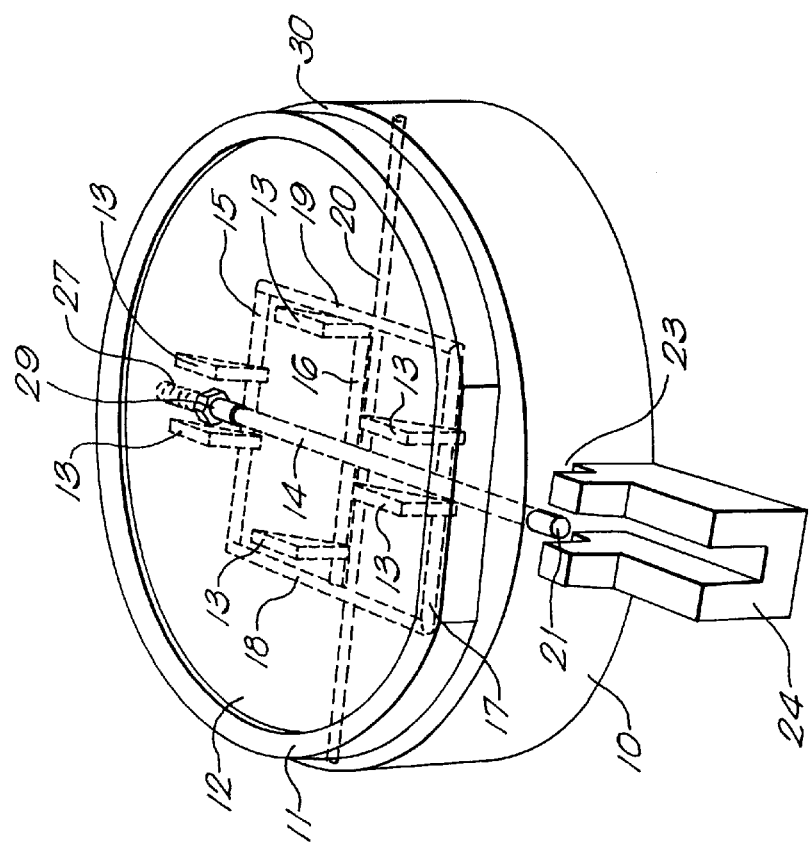
FIG. 1 shows a perspective view of a housing, trigger plate and internal assembly, suitable for attachment to a mainspring as disclosed in my earlier application W097/11599.
Figure 3:
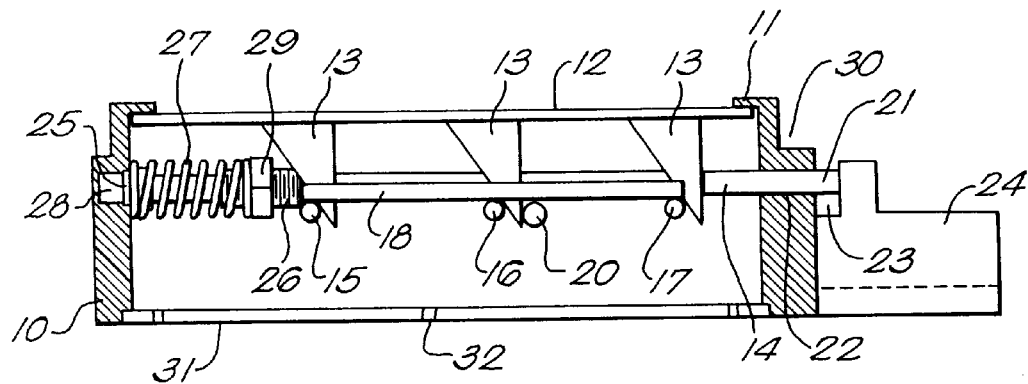
FIG. 3 shows a side elevation of the trigger mechanism in the set position, ie. untriggered.

Referring to the drawings, the trigger mechanism as shown in FIGS. 1 and 2 comprises a shallow cylindrical housing 10, aligned vertically, with an inward facing lip 11 formed around its upper circumference. This retains a trigger plate 12, which has wedge-like cam surfaces 13 depending from its lower (internal) surface. A trigger pin 14 is fixed to a frame of crossbars 15, 16, 17, 18, 19, and a rod 20 is fixed across the centre of a housing. One end 21 of the trigger pin 14 passes slidably through a hole 22 in the front of the housing 10, to lie over a slot 23 and thereby close the top outlet of that slot. This can be employed to retain the upper arm of a mainspring of, for example, the trap described in my W097/11599. The end 21 of the trigger pin 14 therefore retains the mainspring under tension. The remainder of the connector 24 can accommodate a lower arm of a mainspring (not shown). The other end 25 of the trigger pin 14 (see FIGS. 3, 4 and 5) passes through a short length of threaded studding 26 and a coil spring 27 before being housed in a recess 28 formed in the rear of the housing. A nut 29 is threaded onto the studding 26. The transverse rod 20 passes across the centre of the housing 10 and rests up against the front of the two centre cam elements 13 and lies across the crossbars 18 and 19. When the trigger mechanism is "set" as shown in FIG. 3, the coil spring 27 pushes against the nut 29, which in turn forces the studding 26 against the crossbar 15. Because the crossbars 15, 16 and 17 are all firmly fixed to the trigger pin 14, and also bear directly on the slanting surfaces of the wedges 13, the tension of the coil spring 27 pushes the front end 21 of the trigger pin 14 through the hole, thereby retaining the mainspring, and also forces the wedges 13 upwards thus biassing the trigger plate 12 against the lip 11. The wedges cannot move forward, due to the presence of the rod 20.

This not only seals the trigger plate 12 against the housing 10, thereby preventing entry of dirt, etc., but also necessitates that the force be applied to the trigger plate 12 in order to depress it. Such a force could be exerted by the foot of a target animal. The force required to depress the trigger plate 12 can be adjusted by turning the nut 29 so as to move it either towards or away from the tension of the coil spring 27. This adjustability allows the trap to be adjusted to prevent triggering by an animal which is smaller than the target animal.

Figure 4:
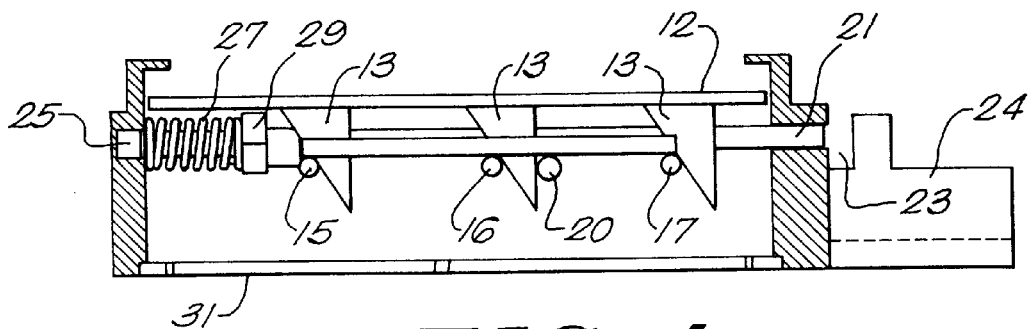
FIG. 4 shows a side elevation of the trigger mechanism in the process of being set off.

When an animal which is at least as heavy as the target animal depresses the trigger plate 12, as shown by the arrow in FIG. 4, the tension of the coil spring 27 is overcome and the cam elements 13 are forced down onto the crossbars 15, 16, 17. As the cam elements 13 cannot move forwards due to rod 20, the crossbars 15, 16, 17 are forced rearwardly so pulling the front end 21 off the trigger pin 14 back from the slot 23. This releases the arm of the mainspring, triggering the trap.

Figure 5:
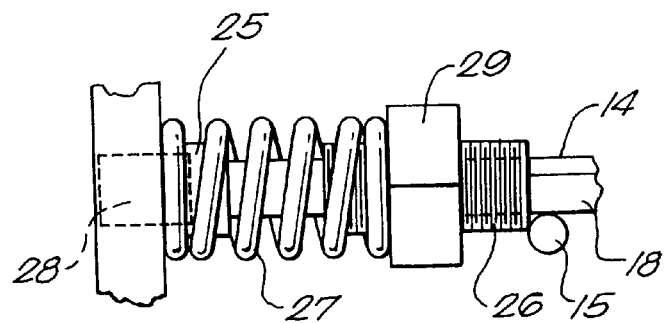
FIG. 5 shows an enlarged view of a means to adjust the tension of the trigger assembly.

As shown in FIG. 5, the rear end 25 of the trigger pin 14 is accommodated in its rearwards move by the recess 28.

A channel 30 is formed around the housing 10 at its upper edge, to accommodate the noose or snare (not shown) of the trap. In the example of my trap referred to earlier, the noose is lifted vertically up the animal's leg and tightened in one action as the mainspring is released.

The transverse rod 20 not only prevents the cam elements 13 from moving forwards, hence preventing the trigger plate 12 from rotating horizontally within the housing 10, but by bearing against the crossbars 18 and 19 also prevents the trigger pin/frame assembly 14–19 from being rotated vertically by the wedges when the trigger plate 12 is depressed off-centre. This allows each wedge 13 to bear equally on the crossbars 15, 16, 17 and for the trap to be triggered when the trigger plate 12 is depressed by a uniform distance substantially anywhere on its surface.

A baseplate 31 can be fitted, to prevent the entry of dirt, etc. It should preferably have holes 32 in order to allow rainwater to drain away.

Figure 6:
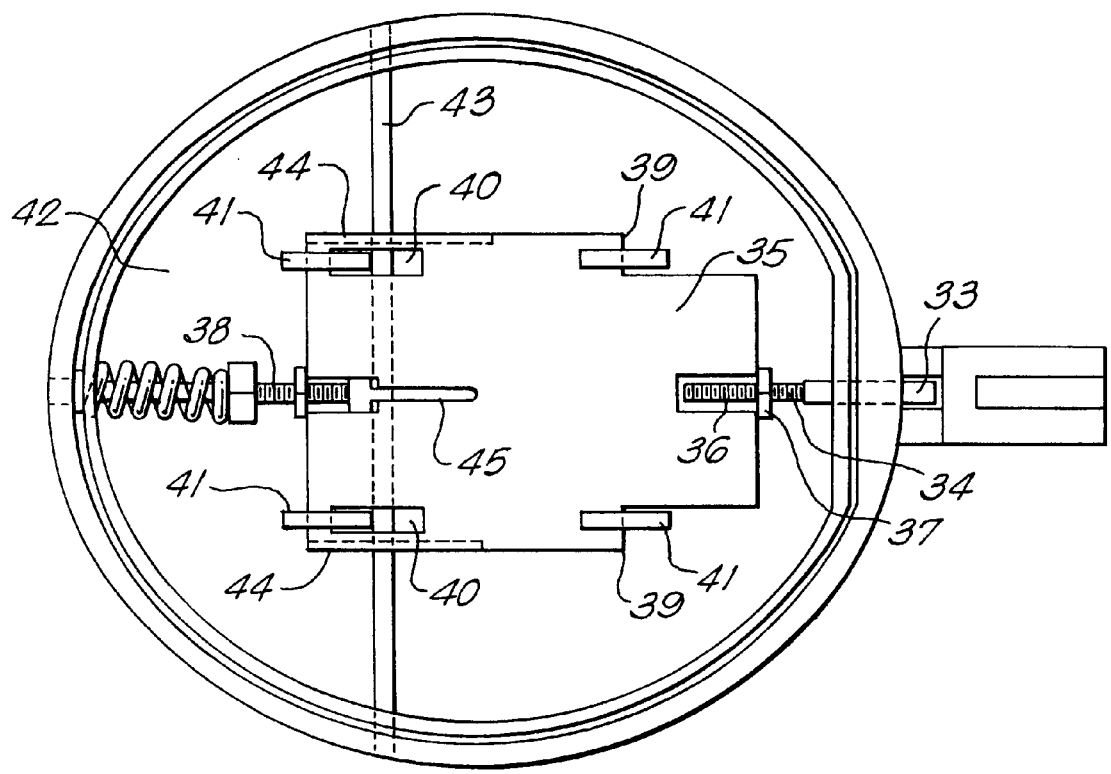
FIG. 6 shows a plan view of a second embodiment of the present invention.
Figure 7:
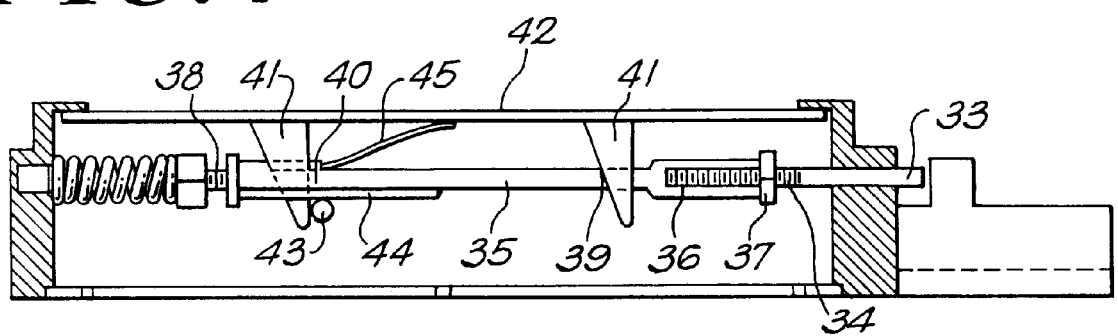
FIG. 7 shows a side elevation of the embodiment of FIG. 6.

FIGS. 6 and 7 show an alternative trigger pin/plate assembly. This comprises a short trigger pin 33, threaded at one end 34, and screwed into a rigid plate 35 at a threaded recess 36 thereon. A locking nut 37 secures the trigger pin 33 in position, allowing the length of the trigger pin 33 to be adjusted. A rear pin 38 is similarly attached to the rigid plate 35. The plate 35 has recesses 39 and slots 40 to allow the cam elements 41 to bear upon it and drive it rearwardly when the trigger plate 42 is depressed. A rod 43 bears against the rear wedges 41 and raised rails 44 on the rigid plate 35, thereby preventing forward movement of the cam elements 41 and rotational movements of the trigger plate 42 and trigger pin/plate assembly 33, 35, 38. An additional spring 45 may be added to assist in raising the trigger plate 42.

The above trigger mechanisms can be used with substantially any type of trap, for example to release a mainspring as described above, to release the closing doors of a cage trap, to release a net or other capturing means, or to release the killing spring of a "breakback" trap.

I claim:

1. A trigger mechanism for an animal trap, comprising;
   a trigger plate moveable in a vertical direction, provided with at least one cam surface on its lower face,
   a retaining pin for preventing release of the trap until triggered,
   slidable longitudinally thereby to allow release of the trap,
   the retaining pin being linked to at least one cam follower, such that downward movement of the trigger plate causes the retaining pin to slide thereby causing release of the trap.

2. A trigger mechanism according to claim 1 comprising a plurality of cam surfaces and cam followers.

3. A trigger mechanism according to claim 2 in which the cam surfaces comprise a first substantially vertical surface and a second inclined surface, the cam followers abutting against the inclined surfaces.

4. A trigger mechanism according to claim 3 including means for preventing the trigger plate from rotating about a vertical axis.

5. A trigger mechanism according to claim 4 in which the means for preventing the trigger plate from rotating comprises a rod abutting the first substantially vertical surfaces of the cam surfaces.

6. A trigger mechanism according to claim 2 in which the cam followers are provided on a support frame.

7. A trigger mechanism according to claim 6 including means for preventing the support frame from rotating about a horizontal axis.

8. A trigger mechanism according to claim 7 in which the means for preventing the support frame from rotating comprises a rod adjacent a surface thereof.

9. A trigger mechanism according to claim 1 including means for preventing the trigger plate from rotating about a vertical axis.

10. A trigger mechanism according to claim 1 in which the trigger plate is biased upwardly.

11. A trigger mechanism according to claim 10 in which the biasing of the trigger plate is adjustable.

12. A trigger mechanism according to claim 1 in which the retaining pin is biased so as to prevent release of the trap.

13. A trigger mechanism according to claim 12 in which the biasing of the retaining pin is adjustable.

14. A trigger mechanism according to claim 13 in which the retaining pin is biased by a spring bearing against a nut on the retaining pin.

15. A trigger mechanism according to claim 14 in which the spring is a compressed coil spring.

16. A trigger mechanism according to claim 1 in which the length of the retaining pin is adjustable.

* * * * *

UNITED STATES PATENT AND TRADEMARK OFFICE
CERTIFICATE OF CORRECTION

PATENT NO.   : 6,016,624
DATED        : January 25, 2000
INVENTOR(S)  : Rose

Page 1 of 1

It is certified that error appears in the above-identified patent and that said Letters Patent is hereby corrected as shown below:

Drawings,
Figure 4, insert an arrow, pointing downward, at the left edge of the middle wedge-like cam surface designated by the number 13;
Figure 4, insert the threading of the nut (26), as has been done in figures 3 and 5, to the right of the nut (29);
Figure 4, insert the rear recess of the trigger pin (28), into the main body of the trigger mechanism (10), in which the rear of the trigger pin (25) is housed;
Figure 5, remove the lines from the spring (27) so that the recess (28) ends at the right edge of the main body (10);
Figure 5, insert a dashed line within the sleeve of the main body to show the trigger pin housed within (25).

Column 2,
Line 65, replace "off" with -- of --.

Signed and Sealed this

Eighteenth Day of October, 2005

JON W. DUDAS
*Director of the United States Patent and Trademark Office*